United States Patent

[11] 3,630,170

| [72] | Inventor | Nicholas Christo<br>Boonton, N.J. |
|---|---|---|
| [21] | Appl. No. | 29,106 |
| [22] | Filed | Apr. 14, 1970 |
| [45] | Patented | Dec. 28, 1971 |
| [73] | Assignee | Continental Commerce Corporation<br>Englewood, N.J. |

[54] TAPE AMOUNT INDICATOR FOR TAPE RECORDERS
4 Claims, 4 Drawing Figs.

[52] U.S. Cl. .................................................... 116/114,
116/67 A, 274/4 C, 352/172
[51] Int. Cl. ...................................................... G01d 21/00
[50] Field of Search ............................................ 116/67 A,
114, 114.10, 129; 274/4 C; 352/170, 171, 172

[56] References Cited
UNITED STATES PATENTS

| 1,208,646 | 12/1916 | Power | 116/67.2 UX |
|---|---|---|---|
| 2,326,654 | 8/1943 | Jagust | 352/172 |
| 2,597,939 | 5/1952 | Lamb | 116/129 |
| 2,624,306 | 1/1953 | Hatke | 116/67.2 X |
| 2,987,956 | 6/1961 | Planert et al. | 352/78 |
| 3,016,620 | 1/1962 | Wittel et al. | 352/172 X |
| 3,040,698 | 6/1962 | Gray | 116/129 |

FOREIGN PATENTS

| 450,766 | 7/1936 | Great Britain | 16/114 |
|---|---|---|---|
| 1,541,364 | 8/1968 | France | 274/4 C |
| 483,283 | 7/1953 | Italy | 274/4 C |

*Primary Examiner*—Louis J. Capozi
*Attorney*—Ernest F. Marmorek

ABSTRACT: The present invention relates to a transparent cartridge or cassette-type tape container device which is adapted to be inserted for recording or playback into a tape recorder and in which a predetermined length of tape is stored preferably on a pair of reels, the improvement residing in the provision of an indicator supported in the container at one end and having a pointer at the other end thereof. The pointer sweeps along a scale which is either formed on the container device or which is in the form of a strip secured to the container device. The movement of the indicator is caused by the varying amount of the tape on one of the reels as sensed by the indicator with a portion thereof abutting against the tape on the reel.

PATENTED DEC 28 1971 3,630,170

INVENTOR:
NICHOLAS CHRISTO,

BY
HIS ATTORNEY.

TAPE AMOUNT INDICATOR FOR TAPE RECORDERS

FIELD OF THE INVENTION

The present invention relates generally to a cartridge or cassette-type tape container device, and more particularly it relates to a tape amount indicator device permanently built into the container device.

BACKGROUND OF THE INVENTION

Tape recorders used for dictating or conference purposes are preferred to be provided with a device which measures the length of the tape used during the recording or the time which elapsed from the beginning of the recording, in order to have a quick reference to any portion of the recording.

Tape recorders of the portable type and operating with interchangeable reels of larger dimensions have been provided with mechanical counters measuring the dispensed tape length in feet or any other preferred unit of length.

Table-type dictaphones are provided with time or length measuring units which provide an accurate indication of the tape length or the tape time used up; however, such units require an elaborate mechanical connection between the reel-rotating mechanism and the indicator itself.

With the appearance of pocket-size tape recorders using cartridge or cassette-type tape containing units which are insertable into the pocket-size tape recorder for recording or playback purposes, need arose for indicators which in size and in reliability can be adapted to the extremely small size of such tape recorders.

Tape length indicators for use with cartridge or cassette-type containers are known in individual units which, when a tape length measurement is desired, must be held against the edge of the cassette and to extend a protruding mechanical sensor into the cassette which, according to the length of protrusion, actuates a digital indicator connected thereto. The disadvantage of such indicators resides in that they are separate units, they have to be carried separately and they require additional manual operation by the user of the tape recorder which entails an interruption of the dictating process.

BRIEF SUMMARY OF THE INVENTION

It is, therefore, an object of the present invention to provide a novel indicator device in a cartridge or cassette-type tape container which reliably indicates the length of tape used or the length of tape present on either one of the reels without requiring additional manual operation or interruption of the dictating process.

It is another object of the present invention to provide an indicator device for use with a cartridge or cassette-type tape container insertable into a tape recorder and in which a single indicator mechanism is used to indicate the length of tape present on either of the pair of reels and in which the pointer of the indicator sweeps along a scale facing the user of the tape recorder in each instance of operation.

It is still a further object of the present invention to provide a novel indicator device for a cartridge or cassette-type tape container insertable into a pocket size dictating device in which the tape length or time indicating scale is shaped to improve the readability.

The invention provides in a transparent cartridge or cassette-type container device which is adapted to be inserted for recording or playback into a tape recorder a novel indicator means which is supported in the container device at one end portion thereof and having a pointer means at the other end portion thereof, the indicator means being biased in abutting relationship against the tape on one of the reels on which the tape is wound or from which is being unwound, the indicator means following the receiving or increasing amount of tape on the reel and sweeps along a scale means which indicates in units of length or time the amount of tape or time used up from either of the reels.

In accordance with another aspect of the invention, an improved scale arrangement is obtained by the provision of the scale on a domed portion of the housing which in its curvature substantially follows the circular path of motion of the pointer means of the indicator device.

The invention will become more relatively apparent from the following description of preferred embodiments thereof shown in the accompanying drawings, in which:

DESCRIPTION OF THE PREFERRED EMBODIMENTS

Figure 1:
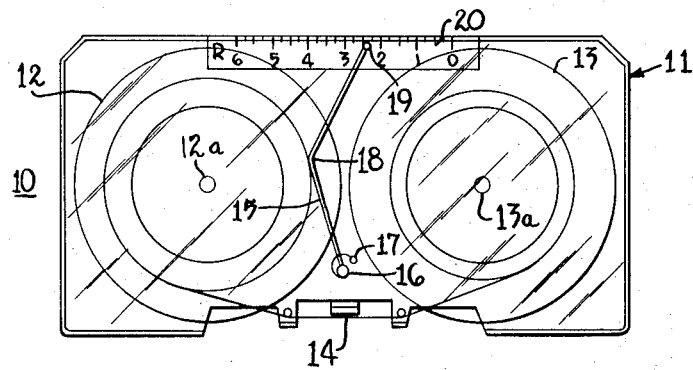
FIG. 1 is a side view of a transparent cartridge or cassette-type container device illustrating the novel indicator means according to the present invention.

With reference to FIG. 1 it is seen that a cartridge or cassette-type tape container 10 includes a housing 11 which is made preferably from a transparent plastic material and which is generally of rectangular form having two major sidewalls and four transverse connecting walls the width of which is made sufficient to accommodate a tape having a width commonly used in cartridge or cassette-type tape recorders. A pair of tape-storing means 12 and 13 is formed in the housing which can be in the form of either a pair of reels or other type of web device into which a roll of tape 14 can be reliably wound. The driving of the reels or web device 12 and 13 is accomplished by a respective pair of drive pins 12a and 13a which are coupled to the driving mechanism of the tape recorder, not shown, in a known manner.

The container 11 on its lower portion is provided with corresponding openings and spaces to establish contact between tape 14 and the recording and playback heads of the tape recorder (not shown).

According to the invention a novel indicator device 15 is provided which is rotatably supported between the two major sidewalls of the container housing 11 on a pinlike shaft 16. The indicator means 15 can be made from a single strip of metallic or plastic material and is biased by a spring 17 against the convolution of the tape 14 present on one of the reels, preferably indicated as being the left reel 12, so that a reliable contact exists at all times between the convolutions of tape 14 and indicator 15 at a bent portion 18 thereof. The indicator 15 is constructed and shaped in a manner so that a pointer 19 placed at its end portion sweeps completely the entire length of a scale 20 between its two extreme positions. At one position indicating the absence of tape on the left reel 12 the indicator 15 moves to the lower most position with its bent portion 18 closer to driving pin 12a and as a consequence the pointer moves to the left end of the scale, while in the other position it approaches the right end of the scale indicating that the left tape is still full. Scale 20 seen in FIG. 1 is graduated to indicate the length of the tape or the time which is needed for the full expenditure of the tape from reel 12 in a certain number of units.

In many dictaphones in order to use a second track on the tape the cartridge or cassette-type container is inverted and is placed back into its recording or playback position in which the formerly left side reel becomes the right side reel and vice versa. For a similar purpose as above, the side not shown in FIG. 1 carries a scale similar to the one seen in FIG. 1 but which is graduated in the opposite sense than the scale 20 indicating the tape conditions on the left reel 12. In other words, the single indicator 15 is, therefore, used to indicate the tape conditions on both reels at the same time.

Figure 2:
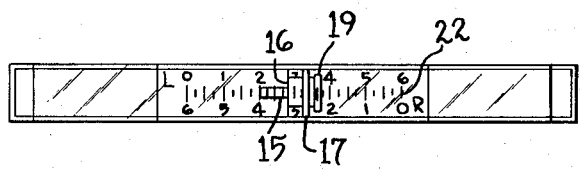
FIG. 2 is a plan view of the container device according to FIG. 1 illustrating an additional scale feature of the present invention.

A further scale arrangement according to the invention is illustrated in FIG. 2 which is placed on the narrow connecting wall of the container device 10 and which is very advantageously used in the event that the tape recorder is positioned such that the user of the dictaphone faces the narrow end of the cartridge or cassette-type container 11. Its advantage becomes apparent also when used with some of the existing tape recorder models which are constructed to receive the cartridge or cassette-type container with only its narrow edge protruding out of the tape recorder and facing the user of the tape recorder.

The scale 22 shown in FIG. 2 is a combination of a pair of scales indicating the tape conditions on both the left 12 and right 13 reels concurrently by each being graduated in the opposite sense.

Figure 3:
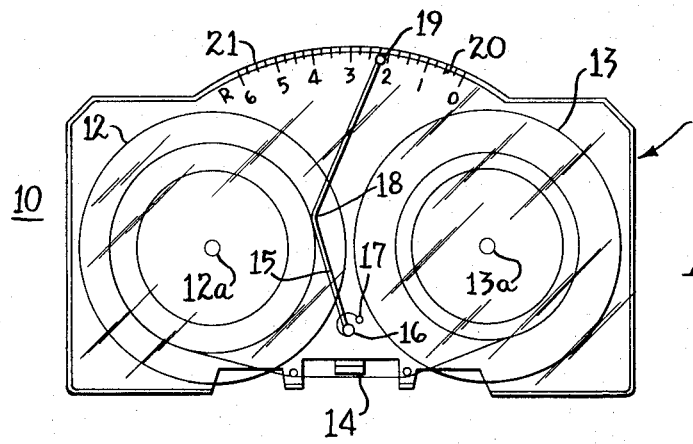
FIG. 3 is a similar view of the container device as in FIG. 1 illustrating another embodiment of the scale feature of the present invention.
Figure 4:
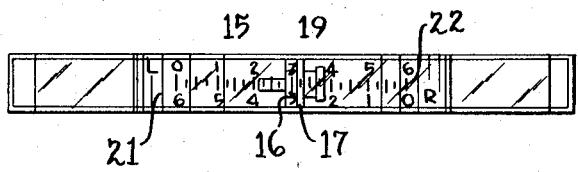
FIG. 4 is a top view of the container device according to FIG. 3.

FIG. 3 illustrates an improved scale embodiment of the present invention in which the indicator 15 is somewhat extended and protrudes beyond the general upper edge of the housing 11 into a curved domed portion 21 which with its curvature generally follows the circular path of movement of pointer 19 of indicator 15. The domed construction allows for a better readability of the position of the pointer 19 with respect to the scale 22, especially when scale 22 is placed or formed on the domed portion itself.

The scale 20 or 22 according to the present invention are either permanently formed by etching or various die methods on the plastic housing 11 itself or they are printed on a strip of material which is then secured to the surface of the container 11. It is obvious that the strip of material must be transparent in order to provide for an easy spotting of pointer 19 which can be distinctly colored such as red.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

I claim:

1. A transparent tape container device adapted to be inserted for recording or playback into a tape recorder device comprising means for storing a predetermined length of tape in a pair of adjacently disposed means one of which releases the tape and the other of which takes up the released tape, the improvement comprising:

indicator means supported in said container device at one end portion thereof and having a pointer means at the other end portion thereof, means biasing said indicator means in abutting relationship against the tape on one of said adjacently disposed means, scale means on said container device adjacent said pointer means, said indicator means being structured for providing for sweeping equal increments linearly of said scale with increasing or decreasing amounts of the tape, the arrangement being such that said indicator means follows the decreasing or increasing amount of said tape in its convoluted form whereby it linearly sweeps said scale means and indicates the amount of tape or tape time on each of said adjacently disposed means.

2. A transparent tape container device adapted to be inserted for recording or playback into a tape recorder device comprising means for storing a predetermined length of tape in a pair of adjacently disposed means one of which releases the tape and the other of which takes up the released tape, the improvement comprising:

indicator means supported in said container device at one end portion thereof and having a pointer means at the other end portion thereof, means biasing said indicator means in abutting relationship against the tape on one of said adjacently disposed means, scale means on said container device adjacent said pointer means, the arrangement being such that said indicator means follows the decreasing or increasing amount of said tape in its convoluted form whereby it sweeps said scale means and indicates the amount of tape or tape time on each of said adjacently disposed means, wherein said container device has a first sidewall, a second sidewall, and a transverse sidewall, said scale means comprises first scale means disposed on said first sidewall and graduated for indication of the amount of tape or tape time on one of said adjacently disposed means, second scale means disposed on said second sidewall opposite said first sidewall and graduated for indication of the amount of tape or tape time on the other of said adjacently disposed means, the third scale means disposed on a portion of said transverse sidewall and graduated for indication of the amount of tape or tape time on both of said adjacently disposed means.

3. A transparent tape container device adapted to be inserted for recording or playback into a tape recorder device comprising means for storing a predetermined length of tape in a pair of adjacently disposed means one of which releases the tape and the other of which takes up the released tape, the improvement comprising:

indicator means supported in said container device at one end portion thereof and having a pointer means at the other end portion thereof, means biasing said indicator means in abutting relationship against the tape on one of said adjacently disposed means, scale means on said container device adjacent said pointer means, the arrangement being such that said indicator means follows the decreasing or increasing amount of said tape in its convoluted form whereby it sweeps said scale means and indicates the amount of tape or tape time on each of said adjacently disposed means, wherein said container device has a first sidewall, a second sidewall and a transverse sidewall, said scale means comprises first scale means disposed on said first sidewall and graduated for indication of the amount of tape or tape time on one of said adjacently disposed means, second scale means disposed on said second sidewall opposite said first sidewall and graduated for indication of the amount of tape or tape time on the other of said adjacently disposed means, and third scale means disposed on a domed portion of said transverse sidewall and graduated for indication of the amount of tape or tape time on both of said adjacently disposed means, said indicator means having a length for allowing said pointer means to sweep to an equal distance from said domed portion along said third scale means.

4. The combination as claimed in claim 1, wherein said pair of adjacently disposed means are a pair of reel means.

* * * * *

Disclaimer 3,630,170.—*Nicholas Christo*, Boonton, N.J. TAPE AMOUNT INDICATOR FOR TAPE RECORDERS. Patent dated Dec. 28, 1971. Disclaimer filed July 26, 1973, by the assignee, *Continental Commerce Corporation*.

Hereby enters this disclaimer to claims 1 and 4 of said patent.

[*Official Gazette December 4, 1973.*]